Nov. 1, 1966 — A. R. JAMROG — 3,282,793
APPARATUS FOR CONTROLLING THE ATMOSPHERE OVER A NUCLEAR REACTOR
Filed March 3, 1966 — 2 Sheets-Sheet 2

INVENTOR.
Aloysius R. Jamrog
BY
Attorney

# United States Patent Office 3,282,793
Patented Nov. 1, 1966

3,282,793
APPARATUS FOR CONTROLLING THE ATMOSPHERE OVER A NUCLEAR REACTOR
Aloysius R. Jamrog, Chicago, Ill., assignor to the United States of America as represented by the United States Atomic Energy Commission
Filed Mar. 3, 1966, Ser. No. 533,383
3 Claims. (Cl. 176—27)

The invention described herein was made in the course of, or under, a contract with the U.S. Atomic Energy Commission.

This invention relates to an arrangement for controlling the atmosphere adjacent to a nuclear reactor. More specifically, the invention relates to an arrangement for bringing an air atmosphere to a region directly over a nuclear reactor that is otherwise provided with a different atmosphere.

When a nuclear reactor is arranged near a storage rack for used fuel elements that have become depleted in the reactor, it is known to provide a common containment structure for the reactor and the rack, which structure includes above the reactor and rack an extensive space through which the used fuel elements can be moved from the reactor to the rack. If sodium is used for cooling the reactor, a special atmosphere such as argon is needed, and it is most desirable to provide argon in the space above the reactor through which the used fuel elements are moved out. With argon in the space above the reactor, it is difficult for a workman to descend to repair or adjust electrical controls for the control rod(s) for the reactor, and the argon provides difficulties for the electrical controls.

I have invented an arrangement by which a sealed compartment containing air is brought down to the top of the reactor through the extensive space above the reactor which otherwise contains argon. Thus, the electrical controls for the control rod(s) are safe from argon, and a worker can descend to the electrical controls without using a special atmosphere. The compartment is axially collapsible and is attached to the reactor-vessel cover, so that when fuel elements are to be removed from the reactor, the compartment is collapsed upwardly and the cover is lifted from the reactor vessel.

Figure 1:
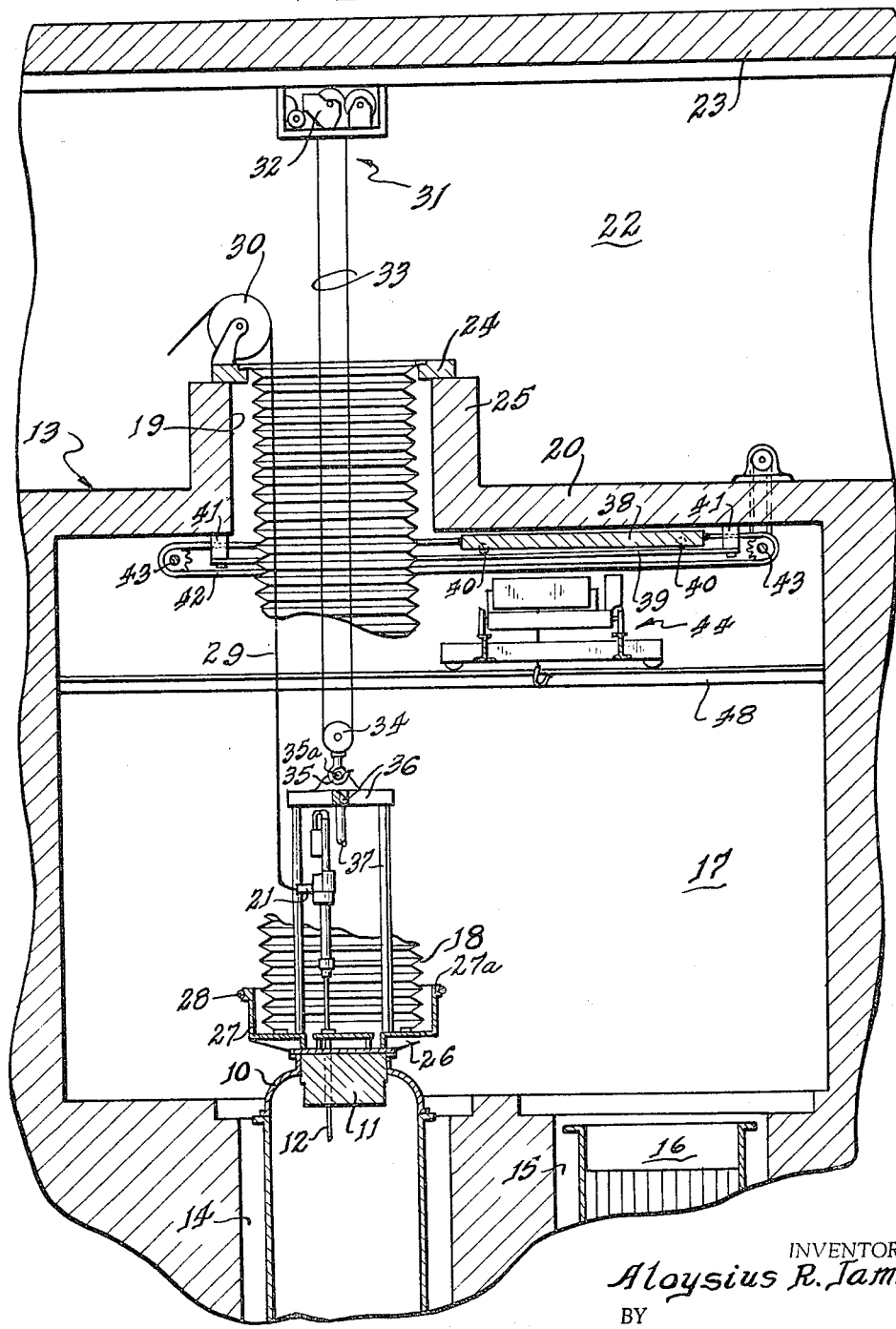
Figure 2:
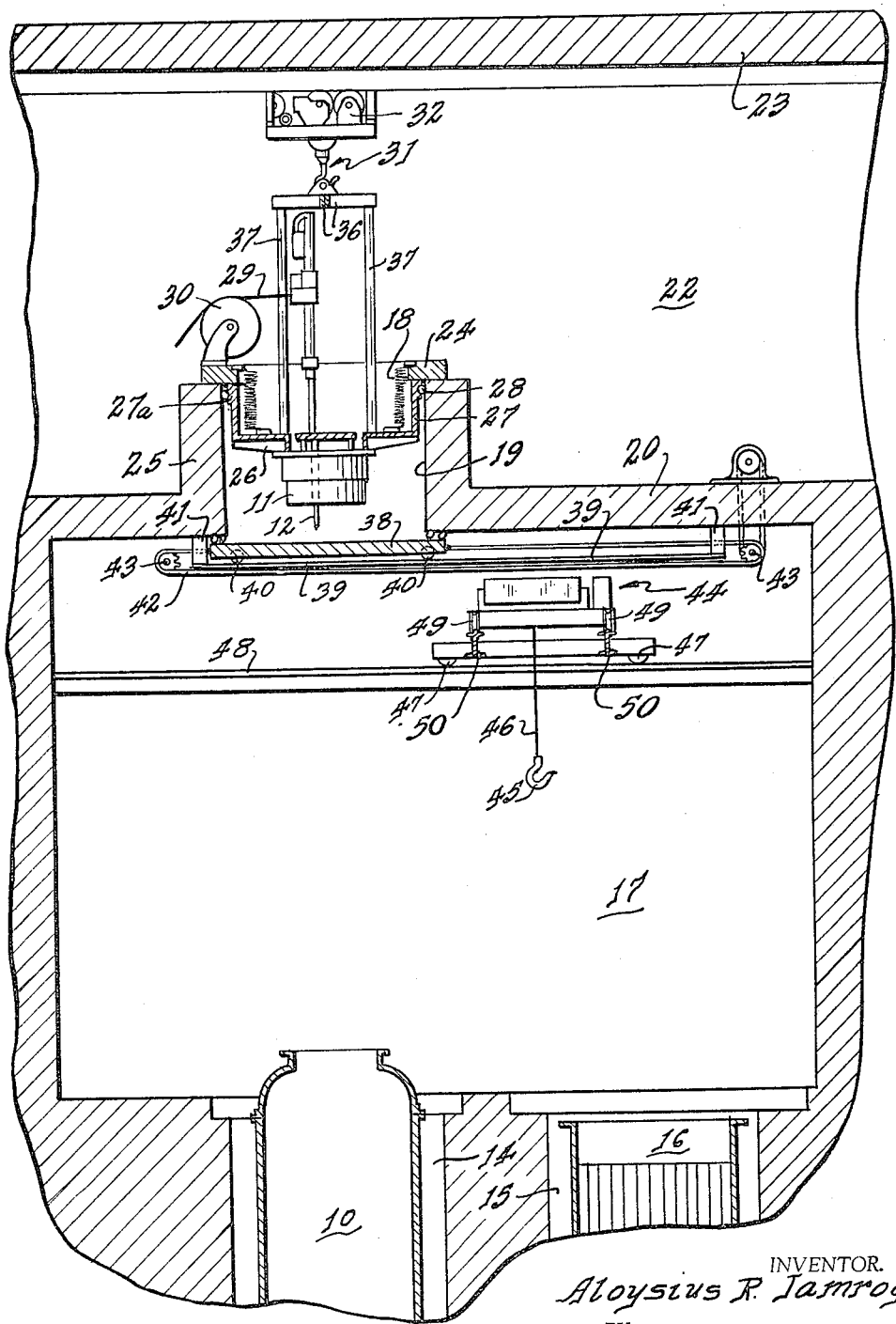

In the drawings:
FIG. 1 is a vertical sectional view through a reactor showing a collapsible bellows of the present invention expanded and a reactor-vessel cover in position on the vessel; and
FIG. 2 is a similar view showing the bellows collapsed and the reactor vessel cover pulled back into a top opening of the containment structure for the reactor.

As shown in FIG. 1, a pressure vessel 10, a plug cover 11 therefor, and a control rod 12 form part of a nuclear reactor, not otherwise shown. It is to be understood that the reactor may have a plurality of control rods, but only one is shown in order to avoid crowding the drawing. The reactor may be formed of a plurality of clad fissile rod-like elements and is cooled by liquid sodium pumped into and out of the vessel 10. Because of the sodium, an argon atmosphere is employed which is present within the vessel 10 and within a concrete containment structure 13. The argon atmosphere is in a space 14 formed in the containment structure 13 for the pressure vessel 10, in a space 15 formed in the containment structure for a storage rack 16 for new and used fuel elements, and in an extensive space 17 in the containment structure above the pressure vessel 10 and the storage rack 16. The rack may contain sodium.

However, the argon atmosphere is excluded from a part of the space directly over the pressure vessel 10 by a long collapsible bellows 18, which has its lower end sealed to the cover 11 and its upper end to an opening 19 in a top 20 of the containment structure 13. The purpose of this exclusion of argon is to keep it from electrical controls 21, which adjust the vertical position of the control rod 12 with respect to the reactor for the sake of reactor control. The presence of argon would adversely affect the electrical controls 21 and would require a special atmosphere for a worker lowered to the electrical controls to repair or adjust them.

Instead of argon, air is within the bellows 18 as well as in a space 22 which is formed between the top 20 and a roof 23 of the containment structure 13 and communicates with the space in the bellows.

The bellows 18 may be constructed in any suitable way. For example, it may be formed of a rubber-impregnated nylon fabric stiffened with metal as disclosed in Argonne National Laboratory Report ANL–7028, pages 7–9. The bellows 18 may be about 40 ft. in length in the extended position of FIG. 1. The upper end of the bellows 18 is sealingly connected to a metal ring 24, which is secured to an annular portion 25 of appreciable depth formed at the opening 19 to extend upwardly from the top 20 of the containment structure 13. The lower end of the bellows 18 is sealingly connected to an annular platform 26 attached to the vessel cover 11. An annular member 27 has its lower end secured to the annular platform 26 and carries on a thickened portion 27a located at its upper end, a seal 28, which is engageable with the opening 19 in the top 20 of containment structure 13 in the raised position of FIG. 2.

An electrical cable 29 leads from the electrical controls 21 upward through the bellows 18 over a pulley 30 mounted in the ring 24. The shift of parts from the position of FIG. 1 to that of FIG. 2 is accomplished by hoist 31, which is supported from the roof 23 and comprises a motor 32, a cable 33, a pulley 34, and a hook 35. The hook engages a pin 35a carried by two horizontal top crossing members 36. Four uprights 37 connect the ends of the top members with the annular platform 26.

As previously stated, a worker without a special atmosphere may enter the bellows 18 to repair or adjust the electrical controls 21, because there is air within the bellows. Such repair may also be conducted when the parts are in the elevated position of FIG. 2. To reach such position, the hoist 31 is operated to cause the motor to take up the cable 33, which lifts the pulley 34 and hook 35. The hook, in turn, acts through the pin 35a, top members 36, uprights 37, and platform 26 to lift the cover 11. The cover, in turn, lifts the control rod 12 and the electrical controls 21 which are supported on the cover.

In the raised position of FIG. 2, the annular member 27 engages the ring 24, and the cover 11 may be supported in this position independently of the hoist 31 by bolts or screws (not shown) passing through the ring 24 and a thickened portion 27a on the annular member 27. Because of the seal 28 acting between the opening 19 and the annular member 27 in the raised position of FIG. 2, the bellows 18 may be removed.

For radiation protection, a lead slab 38 is moved across the opening 19. The slab 38 is supported on the lower side of the top 20 by rails 39 on which wheels or rollers 40 carrying the slab ride. Only one of the rails 39 is shown, and they are suspended from the top 20 by hangers 41. The slab 38 is shifted by a sprocket chain 42 which has its ends connected to the slab and engages sprockets 43.

When the cover 11 and the bellows 18 are out of the way as shown in FIG. 2, new and used fuel elements may be transferred between the vessel 10 and the storage rack 16 by mechanism 44 including a lifting hook 45 and a cable 46 which lowers the hook to the vessel. The mechanism 44 has wheels 47 riding on tracks 48 mounted in opposite sides of the space 17 and thus is shiftable horizontally in the space 17 so as to be first over the vessel 10 and then over the storage rack 16 as needed. Only one track 48 is shown. Also, the cable 46 and hook 45 are movable perpendicularly to the plane of FIGS. 1 and 2 by virtue of wheels 49 and cross beams 50 on which they roll.

It is also understood that the invention is not to be limited by the details given herein but that it may be modified within the scope of the appended claims.

The embodiments of the invention in which an exclusive property or privilege is claimed are defined as follows:

1. In an assembly in which the cover of a reactor vessel is considerably below the top opening of a concrete containment structure and an argon atmosphere exists above the reactor vessel and within the containment structure and electric controls for a control rod are provided on top of the reactor vessel cover, the combination with the top opening, the cover, and the electric controls, of a long axially collapsible bellows containing the electrical controls and having its ends sealed to the opening and the cover so as to provide an air atmosphere for the electrical controls, and means for hoisting the cover and electrical control into and through the opening while collapsing the bellows.

2. The combination specified in claim 1 and further comprising an annular member surrounding the bellows adjacent its lower end, means connecting the lower end of the bellows with the lower end of the annular member, and a seal associated with the upper end of the annular member and engageable with the top opening of the containment structure in the collapsed raised position of the bellows to enable the bellows to be removed without loss of sealing.

3. The combination specified in claim 2 and further comprising a lead slab slidably supported on the lower side of the top of the containment structure, and means for moving the lead slab across the top opening in the containment structure when the bellows is collapsed and the electrical controls and cover of the reactor vessel have been moved into the top opening.

No references cited.

L. DEWAYNE RUTLEDGE, *Primary Examiner.*

H. E. BEHREND, *Assistant Examiner.*